US010349588B2

(12) United States Patent
Yano et al.

(10) Patent No.: US 10,349,588 B2
(45) Date of Patent: Jul. 16, 2019

(54) HYDROPONIC APPARATUS (71) Applicant: PANASONIC INTELLECTUAL PROPERTY MANAGEMENT CO., LTD., Osaka (JP)

(72) Inventors: Hiroshi Yano, Osaka (JP); WooHyeun Jeong, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 266 days.

(21) Appl. No.: 15/329,425

(22) PCT Filed: Jul. 1, 2015

(86) PCT No.: PCT/JP2015/003315
§ 371 (c)(1),
(2) Date: Jan. 26, 2017

(87) PCT Pub. No.: WO2016/035234
PCT Pub. Date: Mar. 10, 2016

(65) Prior Publication Data
US 2017/0208759 A1    Jul. 27, 2017

(30) Foreign Application Priority Data
Sep. 3, 2014  (JP) .................. 2014-178925

(51) Int. Cl.
A01G 31/02    (2006.01)
A01G 7/04     (2006.01)
(Continued)

(52) U.S. Cl.
CPC ............... A01G 31/02 (2013.01); A01G 7/00 (2013.01); A01G 7/045 (2013.01); A01G 31/00 (2013.01);
(Continued)

(58) Field of Classification Search
CPC .................. A01G 31/02; A01G 31/00
See application file for complete search history.

(56) References Cited

U.S. PATENT DOCUMENTS 4,332,105 A * 6/1982 Nir .............. A01G 31/02
                                          137/563
5,287,652 A * 2/1994 Delp ............ A01G 31/02
                                          47/59 R
(Continued)

FOREIGN PATENT DOCUMENTS

EP    0142989     5/1985
JP    10-98961    4/1998
(Continued)

OTHER PUBLICATIONS

Search Report issued in International Bureau of WIPO Patent Application No. PCT/JP2015/003315, dated Oct. 6, 2015.
(Continued)

Primary Examiner — Magdalena Topolski
(74) Attorney, Agent, or Firm — Greenblum & Bernstein, P.L.C.

(57) ABSTRACT

A hydroponic apparatus includes: a cultivation tank that encloses an underground space with a ground surface portion that separates the underground space and an aboveground space; a light applying unit that is controlled to go into either of a light period in which light is applied to the plant and a dark period in which light is not applied to the plant; an aboveground temperature detection unit that detects a temperature of the aboveground space; an aboveground temperature adjustment unit that adjusts the temperature of the aboveground space and a control unit that controls the aboveground temperature adjustment unit based on information on the temperature of the aboveground space detected by the aboveground temperature detection unit. The control unit controls the aboveground temperature adjust-
(Continued)

ment unit such that the temperature of the aboveground space in the dark period is lower than the temperature of the aboveground space in the light period.

6 Claims, 6 Drawing Sheets

(51) Int. Cl.
  *A01G 7/00* (2006.01)
  *A01G 31/00* (2018.01)
(52) U.S. Cl.
  CPC ........... *Y02A 40/264* (2018.01); *Y02P 60/146* (2015.11); *Y02P 60/216* (2015.11)

(56) References Cited

U.S. PATENT DOCUMENTS

| | | | | |
|---|---|---|---|---|
| 5,937,575 | A * | 8/1999 | Zobel | A01G 31/02 250/339.13 |
| 5,956,897 | A * | 9/1999 | Takashima | A01G 31/00 47/1.01 R |
| 6,088,958 | A | 7/2000 | Oka et al. | |
| 2001/0017004 | A1* | 8/2001 | Zobayed | A01G 9/18 47/59 R |
| 2005/0000159 | A1* | 1/2005 | Billette | A01G 31/02 47/79 |
| 2011/0000807 | A1* | 1/2011 | Snelten | A01G 9/16 206/423 |
| 2011/0115385 | A1* | 5/2011 | Waumans | A01G 7/045 315/152 |
| 2013/0145688 | A1* | 6/2013 | Tatsumi | A01G 7/00 47/60 |
| 2013/0205448 | A1* | 8/2013 | Carraro | C12N 15/8205 800/294 |
| 2014/0033609 | A1* | 2/2014 | Tyler | A01G 31/02 47/62 R |
| 2015/0237810 | A1* | 8/2015 | Van Gemert | A01G 7/02 47/66.7 |
| 2015/0313103 | A1 | 11/2015 | Yano | |
| 2017/0049082 | A1* | 2/2017 | Kim | A01G 31/02 |
| 2017/0071143 | A1* | 3/2017 | Newsam | A01G 9/20 |
| 2018/0132434 | A1* | 5/2018 | Fu | A01G 22/00 |
| 2018/0242539 | A1* | 8/2018 | Bhattacharya | A01G 7/045 |
| 2018/0332788 | A1* | 11/2018 | Leo | A01G 31/02 |

FOREIGN PATENT DOCUMENTS

| | | |
|---|---|---|
| JP | 2003-189749 | 7/2003 |
| JP | 2014-007988 | 1/2014 |
| JP | 2014-113139 | 6/2014 |
| KR | 2012-0119126 | 10/2012 |
| WO | 2014/122703 | 8/2014 |

OTHER PUBLICATIONS

Extended European Search Report for EP 15838373.7 dated Aug. 16, 2017.

* cited by examiner

HYDROPONIC APPARATUS

TECHNICAL FIELD

The present invention relates to a hydroponic apparatus for growing plants without using soil.

BACKGROUND ART

Hydroponics, which does not use soil, has conventionally been used. Hydroponics supplies nutrition to a plant by soaking the roots as part of the underground portion in nutrient solution. In this case, the surrounding temperature of each of the aboveground portion and the underground portion is controlled independently. For example, as disclosed in Patent Literature 1, temperature is controlled depending on the characteristic of the plant such that the ambient temperature around the underground portion is lower than the ambient temperature around the aboveground portion.

CITATION LIST

Patent Literature

Patent Literature 1: Japanese Unexamined Patent Application Publication No. 2003-189749

SUMMARY OF INVENTION

Technical Problem

Generally, plants show different physiological activities in light periods and dark periods. Accordingly, in hydroponics, it is desirable to create a surrounding environment suitable for each of the underground portion and the aboveground portion in each of the light periods and the dark periods. However, the above Patent Literature 1 does not disclose an approach to the creating of the surrounding environment suitable for each of the underground portion and the aboveground portion in each of the light periods and the dark periods.

The present invention has been made in view of the above problem, and an object thereof is to provide a hydroponic apparatus capable of creating a surrounding environment suitable for each of the underground portion and the aboveground portion in each of the light periods and the dark periods.

Solution to Problem

A hydroponic apparatus according to a first aspect of the present invention includes: a ground surface portion that separates an underground space where an underground portion of a plant grows and an aboveground space where an aboveground portion of the plant grows; a cultivation tank that encloses the underground space together with the ground surface portion and stores water or nutrient solution to be supplied to the plant; a light applying unit that is controlled to go into either of a state for a light period in which light is applied to the plant and a state for a dark period in which light is not applied to the plant; an aboveground temperature detection unit that detects a temperature of the aboveground space; an aboveground temperature adjustment unit that adjusts the temperature of the aboveground space; and a control unit that controls the aboveground temperature adjustment unit based on information on the temperature of the aboveground space detected by the aboveground temperature detection unit while controlling the light applying unit, in which the control unit controls the aboveground temperature adjustment unit such that the temperature of the aboveground space in the dark period is lower than the temperature of the aboveground space in the light period.

A hydroponic apparatus according to a second aspect of the present invention includes: a ground surface portion that separates an underground space where an underground portion of a plant grows and an aboveground space where an aboveground portion of the plant grows; a cultivation tank that encloses the underground space together with the ground surface portion and stores water or nutrient solution supplied to the plant; a light applying unit that is controlled to go into either of a state for a light period in which light is applied to the plant and a state for a dark period in which light is not applied to the plant; an aboveground humidity detection unit that detects a humidity of the aboveground space; an aboveground humidity adjustment unit that adjusts the humidity of the aboveground space; and a control unit that controls the aboveground humidity adjustment unit based on information on the humidity of the aboveground space detected by the aboveground humidity detection unit while controlling the light applying unit, in which the control unit controls the aboveground humidity adjustment unit such that the humidity of the aboveground space in the dark period is lower than the humidity of the aboveground space in the light period based on the information on the humidity of the aboveground space detected by the aboveground humidity detection unit.

Advantageous Effects of Invention

According to the present invention, it is possible to create the surrounding environment suitable for each of the underground portion and the aboveground portion in each of the light periods and the dark periods.

DESCRIPTION OF EMBODIMENTS

Hereinafter, embodiments of the present invention will be described referring to the drawings.

First Embodiment

Using FIG. 1, a hydroponic apparatus 100 of a first embodiment will be described. Note that examples of a plant 1 cultivated using the hydroponic apparatus 100 of the embodiment include root vegetables such as *Panax ginseng*

(Korean *ginseng* or Goryeo insam). In other words, the hydroponic apparatus 100 is suitable for cultivating plants with the underground portion that enlarges. However, the plant 1 that can be cultivated using the hydroponic apparatus of the present invention is not limited to these.

(Structure of Hydroponic Apparatus)

The hydroponic apparatus 100 of the embodiment is installed in a chamber 200 in a shape of a container. The chamber 200 has a substantially sealed space. The chamber 200 has a door. A person in charge of cultivation can enter the chamber 200 by opening and closing the door. The space inside the chamber 200 serves as an aboveground space 26 of the hydroponic apparatus 100.

The hydroponic apparatus 100 of the embodiment includes a cultivation tank 6, a light applying unit 5, a ground surface portion 7, an underground temperature detection unit 9, underground temperature adjustment units 20, 40, and 78, an aboveground temperature detection unit 8, an aboveground temperature adjustment unit 90, and a control unit 50. The hydroponic apparatus 100 of the embodiment includes an underground humidity detection unit 19, an underground humidity adjustment unit 41, an aboveground humidity detection unit 18, and an aboveground humidity adjustment unit 91.

Water or nutrient solution 60 is stored in the cultivation tank 6. The cultivation tank 6 includes a discharge pipe 6C for discharging the water or nutrient solution 60. The cultivation tank 6 is supplied with the water or nutrient solution 60 through a supply pipe 6A. The cultivation tank 6 has a structure similar to an aquarium. However, in the case where a culture medium for hydroponics is put into a through hole made in a plastic pipe, the pipe extending in a lateral direction will perform the same functions as the cultivation tank 6. In this case, the single pipe will perform functions of the two parts, the cultivation tank 6 and the ground surface portion 7. Accordingly, the cultivation tank 6 and the ground surface portion 7 of the present invention may have any structure such as a structure in a shape of a pipe in which water or nutrient solution is stored or flows.

The hydroponic apparatus 100 includes the ground surface portion 7 in a shape of a plate having a through hole 7A into which culture medium 30 for hydroponics can be put. In the cultivation tank 6, an underground portion 1A of the plant 1 is positioned above the water or nutrient solution 60 by the culture medium 30 for hydroponics.

The ground surface portion 7 separates an underground space 16 where the underground portion 1A of the plant 1 grows and an aboveground space 26 where an aboveground portion 1B of the plant 1 grows. Although the ground surface portion 7 is a member in a shape of a plate in the embodiment, the ground surface portion 7 may have any shape as long as it can hold the culture medium 30 for hydroponics so as to position the plant 1 above the water or nutrient solution 60. It is preferable that the ground surface portion 7 be made of a material such as expanded polystyrene, for example, in view of reducing weight.

Figure 1:
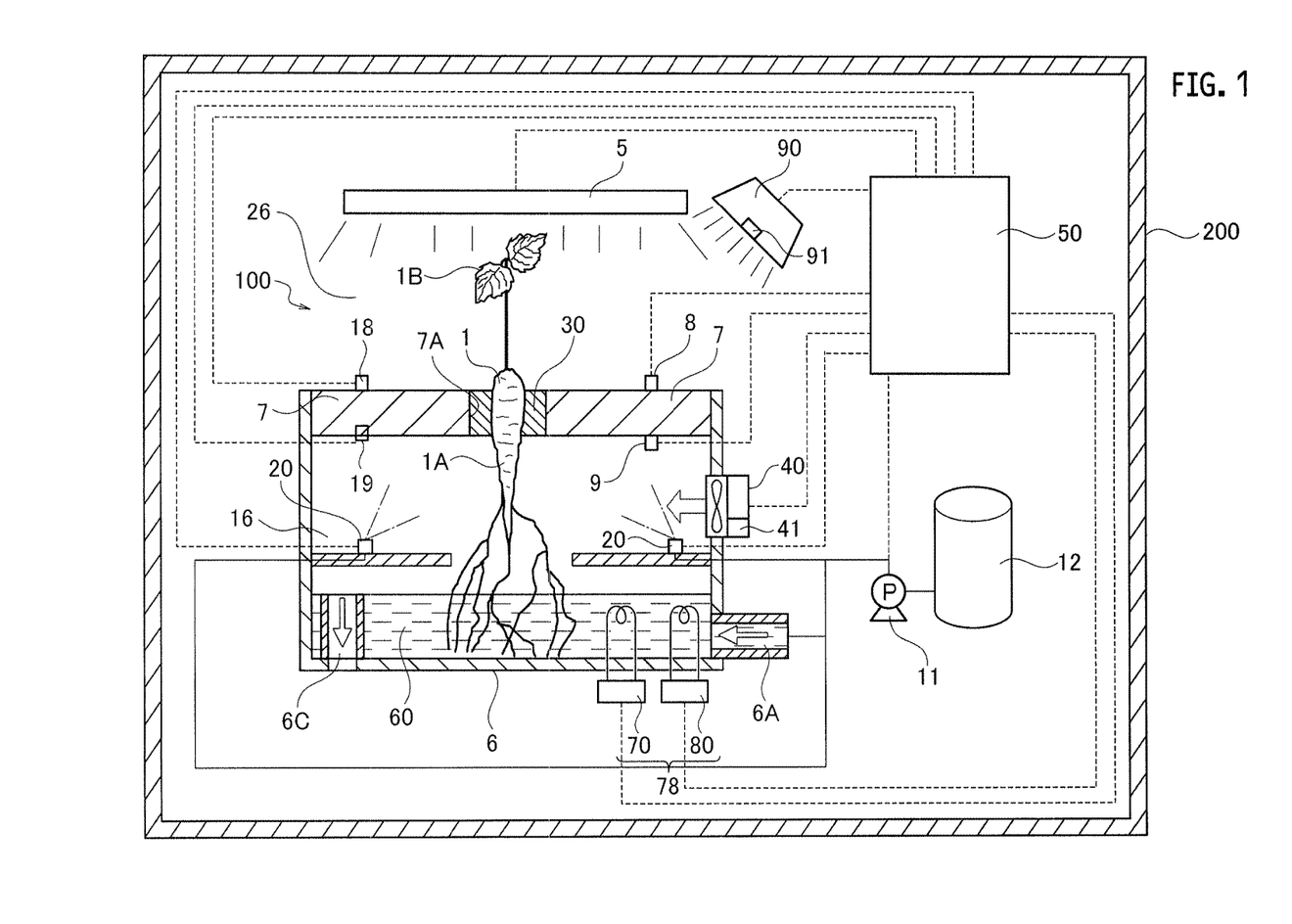
FIG. 1 is a schematic diagram for explaining a hydroponic apparatus according to a first embodiment.

The culture medium 30 of the hydroponic apparatus 100 is arranged to surround the underground portion 1A of the plant 1 as illustrated in FIG. 1 and made of sponge or the like, which is capable of keeping water that permeates its inside.

The culture medium 30 is cylindrically formed along the circumference of the plant 1. The plant 1 is supported by the friction force generated between the plant 1 and the sponge. The sponge serving as the culture medium 30 is capable of elastically transforming, depending on the size of the plant 1 that grows.

The cultivation tank 6 and the ground surface portion 7 enclose the underground space 16 in an integrated manner. The ground surface portion 7 and the cultivation tank 6 form a substantially sealed space. Accordingly, although the atmosphere goes into and out from the underground space 16 to some extent, the atmosphere in the underground space 16 is substantially prevented from going in and out. Here, the ground surface portion 7 and the cultivation tank 6 may have any forms, as long as the temperature and humidity of the atmosphere of the underground space 16 can be controlled.

The hydroponic apparatus 100 of the embodiment has the light applying unit 5 disposed above the plant 1. Since the leaves of the plant 1 project upward from the culture medium 30 for hydroponics, the leaves of the plant 1 can photosynthesize with the light receiving from the light applying unit 5. On the other hand, the roots of the plant 1 hang down from the lower portion of the underground portion 1A in such a way as to be soaked in the water or nutrient solution 60. Accordingly, the plant 1 can absorb the water or nutrient solution 60 through the roots.

The light applying unit 5 is controlled to go into either of a state for light periods in which light is applied to the upper portion of the plant 1 and a state for dark periods in which light is not applied to the plant 1. The light applying unit 5 may be an artificial light source that emits light by itself, or alternatively may be a light guide member that applies to the plant 1 light guided from the sunlight or an artificial light source that emits light by itself.

The underground temperature detection unit 9 detects the ambient temperature of the underground space 16 and transmits the information on the ambient temperature of the underground space 16 to the control unit 50. The aboveground temperature detection unit 8 detects the ambient temperature of the aboveground space 26 and transmits the information on the ambient temperature of the aboveground space 26 to the control unit 50.

The underground humidity detection unit 19 detects the ambient humidity of the underground space 16 and transmits the information on the ambient humidity of the underground space 16 to the control unit 50. The aboveground humidity detection unit 18 detects the ambient humidity of the aboveground space 26 and transmits the information on the ambient humidity of the aboveground space 26 to the control unit 50.

The underground temperature adjustment units 20, 40, and 78 adjust the ambient temperature of the underground space 16. The aboveground temperature adjustment unit 90 adjusts the ambient temperature of the aboveground space 26. The underground humidity adjustment unit 41 includes a humidifier and a dehumidifier and adjusts the ambient humidity of the underground space 16. The aboveground humidity adjustment unit 91 includes a humidifier and a dehumidifier and adjusts the ambient humidity of the aboveground space 26.

The underground temperature adjustment unit 40 includes a mechanism for adjusting the temperature of the air discharged from the inside of the cultivation tank 6 to the outside of the cultivation tank 6 and a mechanism for introducing the air with a temperature adjusted by the adjustment mechanism, from the outside of the cultivation tank 6 to the inside of the cultivation tank 6. Since this makes it possible to adjust the atmosphere of the underground space 16 independently of the atmosphere of the aboveground space 26, the temperature of the underground space 16 can be brought to a target temperature more rapidly.

The underground temperature adjustment unit 78 includes a mechanism for adjusting the temperature of the air existing in the underground space 16 by adjusting the temperature of the water or nutrient solution 60 supplied into the cultivation tank 6. The underground temperature adjustment unit 78 includes a heater 70 and a chiller 80. Depending on the ambient temperature of the underground space 16, either one of the heater 70 or the chiller 80 adjusts the ambient temperature of the underground space 16. According to this approach, the temperature of the underground space 16 is adjusted utilizing a circulation path of the water or nutrient solution 60 necessary for hydroponics. For this reason, the temperature of the underground space 16 can be adjusted without separately providing a circulation path for a heat transfer medium for cooling and heating the underground space 16.

The underground temperature adjustment unit 20 includes a mechanism for adjusting the temperature of the air existing inside the underground space 16 by spraying water or nutrient solution in a form of mist to the plant 1 inside the cultivation tank 6. The underground temperature adjustment unit 20 sprays the water or nutrient solution 60 sent by a pump 11 from the inside of a tank 12, toward the plant 1 from a nozzle. The underground temperature adjustment unit 20 may be a unit that decreases the temperature of the underground space 16 by evaporation heat generated when the water or nutrient solution 60 in the form of mist evaporates. Alternatively, the underground temperature adjustment unit 20 may be a unit that sprays inside the underground space 16 the water or nutrient solution 60 in a form of mist with a temperature adjusted by another heating mechanism or heat absorbing mechanism. The underground temperature adjustment unit 20 makes it possible to perform both spraying the water or nutrient solution 60 to the plant 1 and adjusting the temperature and humidity of the underground space 16 at the same time.

The embodiment has employed a cultivation method in which watering the plant 1 is performed by the underground temperature adjustment unit 20. Here, the method of cultivating the plant 1 may be the nutrient film technique (NFT). Or alternatively, the method of cultivating the plant 1 may be the deep flow technique (DFT). In the case where NFT or DFT is used for the watering method, the underground space 16 does not need to be substantially sealed. However, because the hydroponic apparatus 100 of the embodiment controls the temperature and humidity of the underground space 16, it is preferable that the underground space 16 be substantially sealed.

Figure 2:
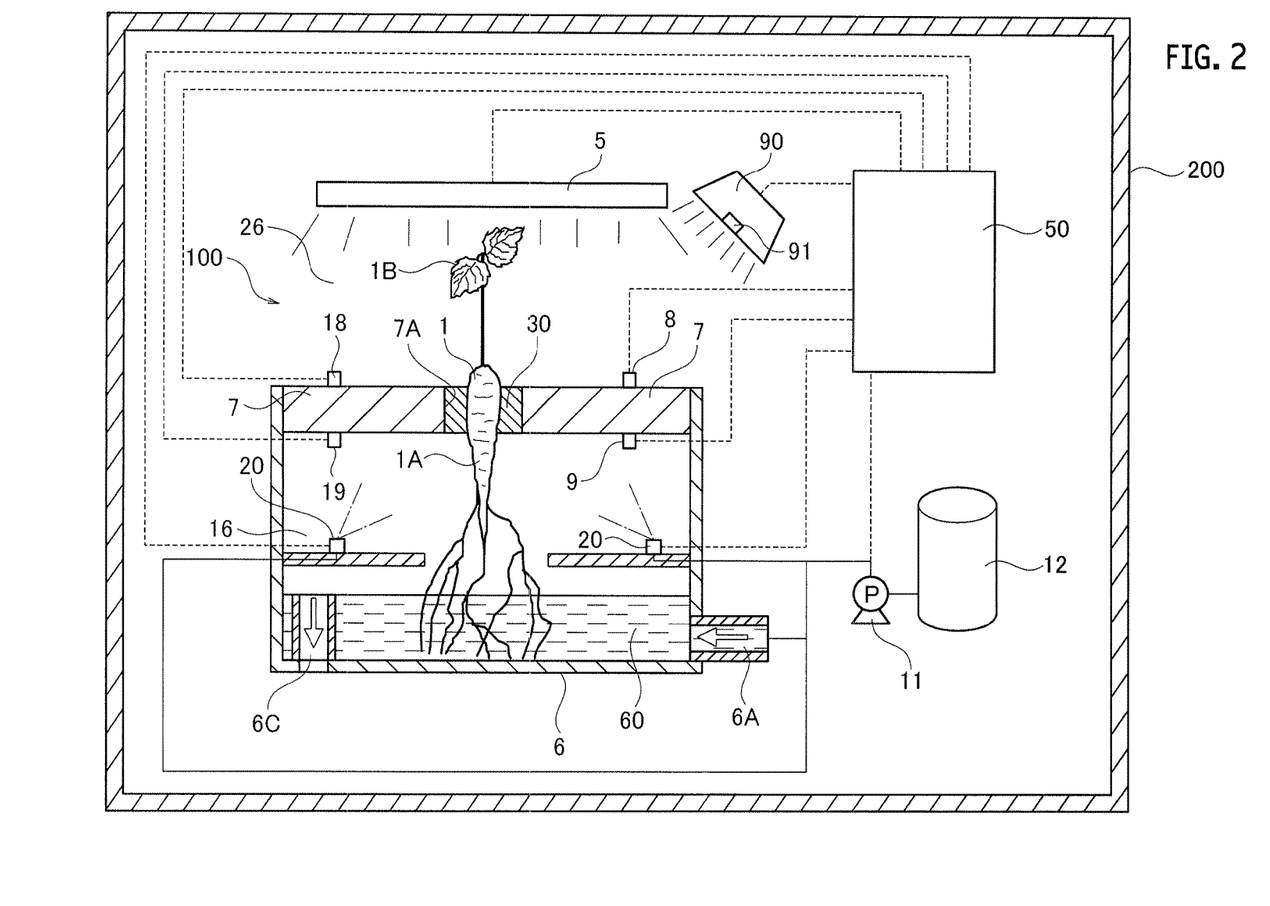
FIG. 2 is a schematic diagram for explaining a hydroponic apparatus according to a second embodiment.
Figure 3:
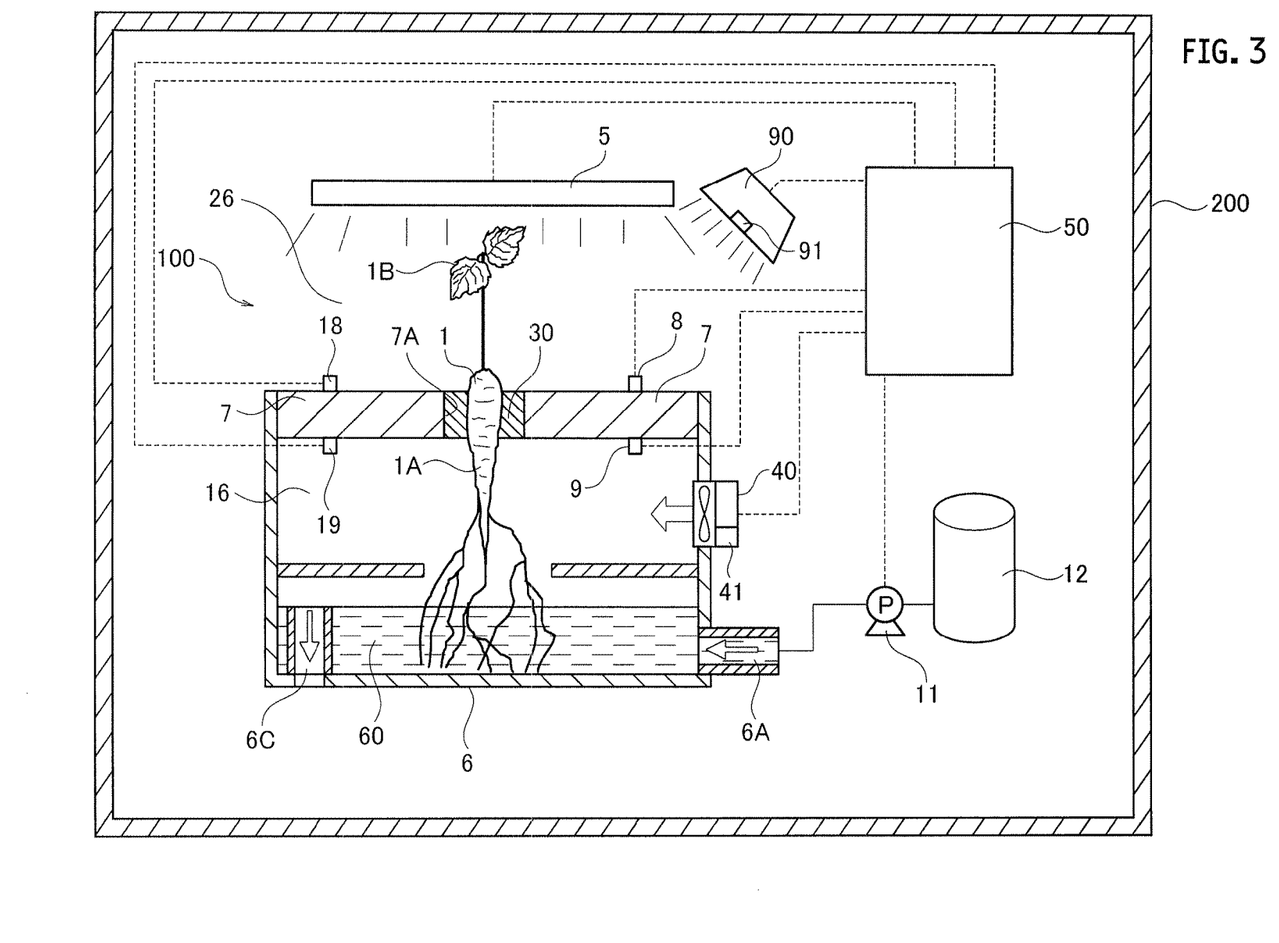
FIG. 3 is a schematic diagram for explaining a hydroponic apparatus according to a third embodiment.
Figure 4:
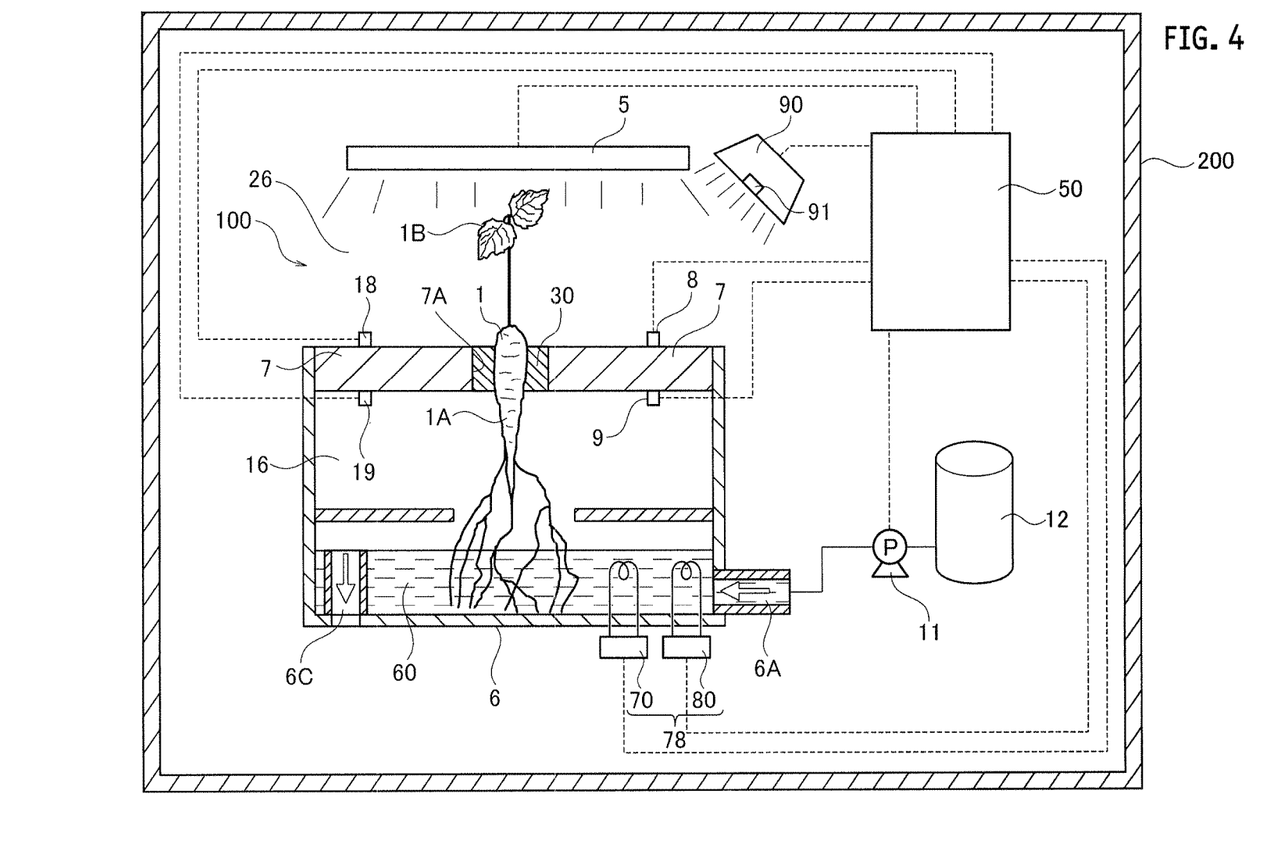
FIG. 4 is a schematic diagram for explaining a hydroponic apparatus according to a fourth embodiment.

In the hydroponic apparatus 100 illustrated in FIG. 1, the three underground temperature adjustment units 20, 40, and 78 adjust the temperature of the underground space 16. However, as in a hydroponic apparatus 100 of a second embodiment illustrated in FIG. 2, only the underground temperature adjustment unit 20 may be provided. As in a hydroponic apparatus 100 of a third embodiment illustrated in FIG. 3, only the underground temperature adjustment unit 40 may be provided. As in a hydroponic apparatus 100 of a fourth embodiment illustrated in FIG. 4, only the underground temperature adjustment unit 78 may be provided. The temperature of the underground space 16 may be controlled by a combination of any two of the three underground temperature adjustment units 20, 40, and 78.

Each of the underground temperature adjustment unit 40 and the aboveground temperature adjustment unit 90 may be a heat transfer mechanism capable of applying heat to atmosphere and removing heat from atmosphere. Alternatively, each of the underground temperature adjustment unit 40 and the aboveground temperature adjustment unit 90 may be an airflow rate adjustment mechanism, such as a damper, to adjust the amount of air introduced into each of the underground space 16 and the aboveground space 26, the temperature of the air being adjusted in advance.

The control unit 50 controls the light applying unit 5. In addition, the control unit 50 controls the underground temperature adjustment units 20, 40, and 78 based on the information on the ambient temperature of the underground space 16 detected by the underground temperature detection unit 9. The control unit 50 controls the aboveground temperature adjustment unit 90 based on the information on the ambient temperature of the aboveground space 26 detected by the aboveground temperature detection unit 8. In addition, the control unit 50 controls the underground humidity adjustment unit 41 based on the information on the ambient humidity of the underground space 16 detected by the underground humidity detection unit 19. The control unit 50 controls the aboveground humidity adjustment unit 91 based on the information on the ambient humidity of the aboveground space 26 detected by the aboveground humidity detection unit 18.

In the embodiment, the control unit 50 controls the aboveground temperature adjustment unit 90 such that the temperature of the aboveground space 26 in the dark periods is lower than in the light periods. According to this approach, by decreasing the temperature of the aboveground space 26, it is possible to reduce the amount of respiration of the plant 1 in the dark periods. In addition, unlike the light periods, the control unit 50 controls the aboveground humidity adjustment unit 91 in the dark periods such that the humidity of the aboveground space 26 is lower than the humidity of the underground space 16. According to this approach, by decreasing the humidity of the aboveground space 26 in the dark periods, it is possible to reduce the amount of respiration of the plant 1 in the dark periods.

(Control of Hydroponic Apparatus)

Figure 5:
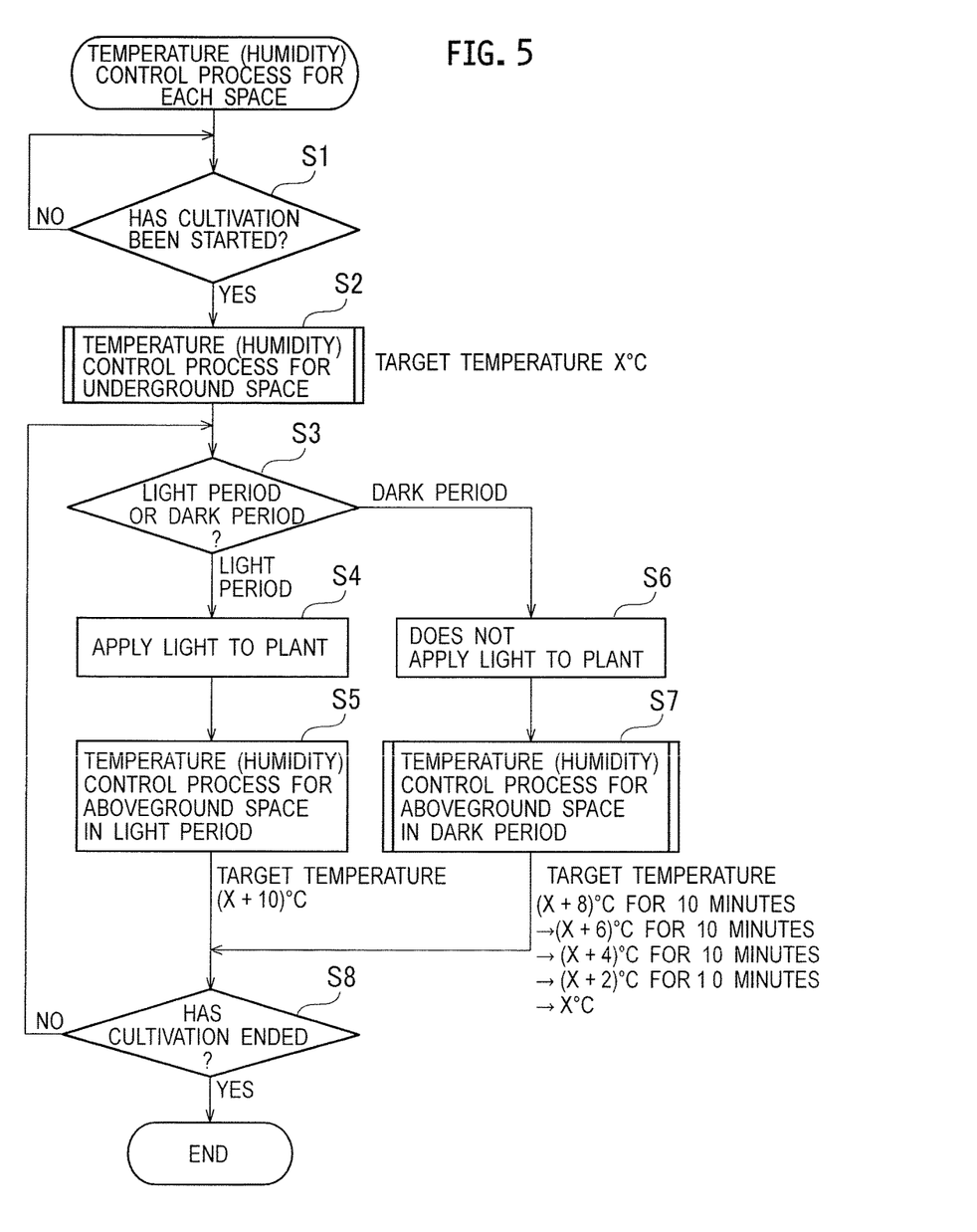
FIG. 5 is a flowchart for explaining a temperature (humidity) control process for each space of the hydroponic apparatus according to the embodiments.

Next, using FIG. 5, descriptions will be provided for a temperature (humidity) control process for each space of the hydroponic apparatus 100 according to the embodiment of the present invention.

As illustrated in FIG. 5, at step S1, the control unit 50 determines whether or not the cultivation of the plant 1 has been started. For example, the control unit 50 determines that the cultivation of the plant 1 has been started, in the case where the control unit 50 receives a signal indicating the turning-on of a switch provided in the hydroponic apparatus 100 for instructing the start of cultivation of the plant 1. However, any method can be used to determine the start of cultivation.

In the case where it is determined at step S1 that the cultivation of the plant 1 has not been started, the control unit 50 repeats the determination process of step S1 until the cultivation of the plant 1 is started. On the other hand, in the case where it is determined at step S1 that the cultivation of the plant 1 has been started, the control unit 50 controls the underground temperature adjustment units 20, 40, and 78 at step S2 such that the ambient temperature of the underground space 16 is kept at an underground target temperature. Assume that the underground target temperature is X° C. in the embodiment.

In the embodiment, the ambient temperature of the underground space 16 is adjusted in both the light periods and dark periods in the same manner. Specifically, the control unit 50 controls the underground temperature adjustment units 20, 40, and 78 such that the temperatures of the underground space 16 in both the light periods and the dark periods are kept at the same temperature.

In other words, the surrounding environment of the underground portion 1A of the plant 1 is kept at a temperature suitable for the growth of the underground portion 1A. According to this approach, it is possible to suppress poor growth of the underground portion 1A of the root vegetables and the like which tend to be adversely affected by temperature changes around the underground portion 1A. However, depending on the kind of the cultivated plant 1, the ambient temperature of the underground space 16 may be adjusted at different temperatures in the light periods and in the dark periods.

Next at step 3, it is determined whether the present time is in a light period or a dark period. Specifically, the control unit 50 determines whether it is a period in which the control unit 50 should control the light applying unit 5 such that the light applying unit 5 goes into the state where light is applied to the plant 1. The control unit 50 may determine whether the present time is in a light period of a dark period based on the time measured by a timer integrated in the control unit 50.

When it is determined at step S3 that the present time is in a period in which the light applying unit 5 should be controlled to go into the state where the light applying unit 5 applies light to the plant 1, the control unit 50, at step S4, shifts the state of the light applying unit 5 to that for the light period in which the light applying unit 5 applies light to the plant 1. If the light applying unit 5 is a light source that emits light by itself, the control unit 50 turns on the light source. If the light applying unit 5 is a light guide member that does not emit light by itself or a window or the like that opens and closes to take in the sunshine, the control unit 50 drives the light guide member or the open-close window to create the state for the light period in which light is applied to the plant 1.

After that, at step S5, the control unit 50 controls the aboveground temperature adjustment unit 90 such that the ambient temperature of the aboveground space 26 is kept at an aboveground target temperature for the light period, which is higher than the underground target temperature. In other words, in the light periods, the control unit 50 controls the underground temperature adjustment units 20, 40, and 78 and the aboveground temperature adjustment unit 90 such that the temperature of the underground space 16 is lower than the temperature of the aboveground space 26. In this embodiment, assume that the aboveground target temperature for the light period is (X+10)° C. For this reason, in the light periods, that is, in the case where the light applying unit 5 is applying light to the plant 1, the temperature of the aboveground space 26 is kept at about (X+10)° C.

On the other hand, when it is determined at step S3 that the present time is in a dark period, the control unit 50, at step S6, shifts the state of the light applying unit 5 to that for the dark period in which the light applying unit 5 does not apply light to the plant 1. If the light applying unit 5 is a light source that emits light by itself, the control unit 50 turns off the light source. If the light applying unit 5 is a light guide member that does not emit light by itself or a window or the like that opens and closes to take in the sunshine, the control unit 50 drives the light guide member or the open-close window to create the state for the dark period in which light is not applied to the plant 1. After that, at step S7, the control unit 50 controls the aboveground temperature adjustment unit 90 such that the ambient temperature of the aboveground space 26 is kept at the aboveground target temperature for the dark period, which is higher than or equal to the underground target temperature and lower than the aboveground target temperature for the light period.

In other words, the control unit 50 controls the aboveground temperature adjustment unit 90 such that the temperature of the aboveground space 26 in the dark periods is lower than in the light periods. Here, the control unit 50 controls the underground temperature adjustment units 20, 40, and 78 and the aboveground temperature adjustment unit 90 in the dark periods such that the temperature of the aboveground space 26 comes close to the temperature of the underground space 16. Specifically, the control unit 50 controls the underground temperature adjustment units 20, 40, and 78 and the aboveground temperature adjustment unit 90 in the dark periods such that the temperature of the aboveground space 26 does not fall below the temperature of the underground space 16. According to this approach, it is possible to reduce adverse effects caused by decreasing the temperature of the aboveground space 26 and exerted to the underground portion 1A. In this step, the control unit 50 controls the aboveground humidity adjustment unit 91 such that the humidity of the aboveground space 26 in the dark periods is lower than in the light periods.

In the embodiment, the aboveground target temperature for the dark period is higher than or equal to X° C. and lower than (X+10)° C. For this reason, in the dark periods, that is, in the case where the light applying unit 5 is not applying light to the plant 1, the temperature of the aboveground space 26 is kept within a range from about X° C. to about (X+10)° C. Here, the aboveground target temperature for the dark period may be a little lower than the underground space target temperature if the aboveground target temperature for the dark period does not affect the growth of the plant 1.

After that, at step S8, the control unit 50 determines whether or not the cultivation of the plant 1 has ended. For example, the control unit 50 may determine that the cultivation of the plant 1 has ended in the case where the control unit 50 receives a signal indicating the turning-on of a switch provided in the hydroponic apparatus 100 for instructing the end of cultivation of the plant 1. Alternatively, the control unit 50 may start measuring the time with a timer after the cultivation starts at step S1 and determine that the cultivation of the plant 1 has ended when the timer shows that a predetermined cultivation period, for example, three months has passed.

Figure 6:
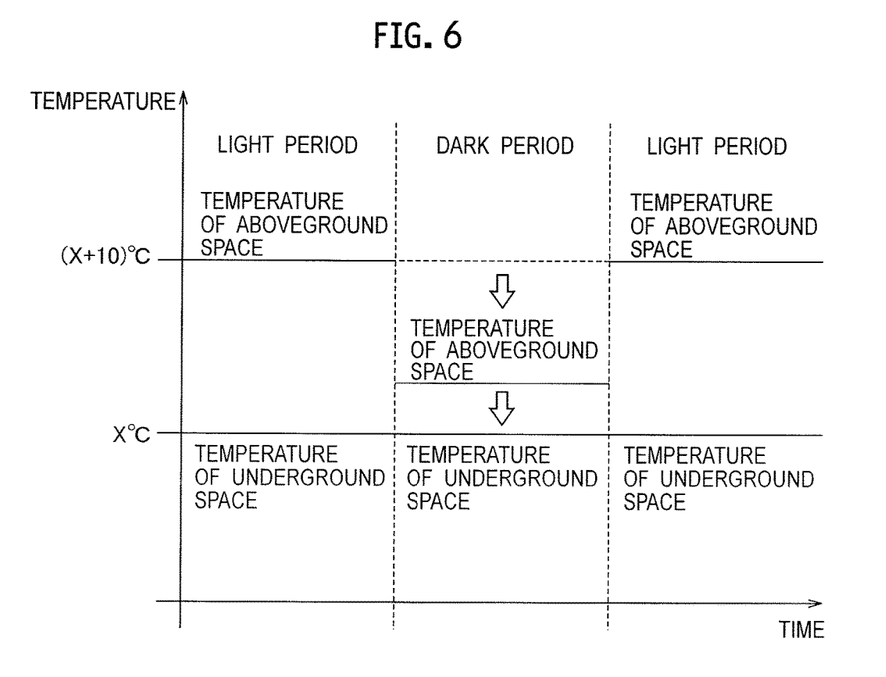
FIG. 6 is a graph schematically illustrating states of temperatures of the underground space and the aboveground space controlled by the control process illustrated in FIG. 5.

FIG. 6 schematically illustrates the states of the temperatures of the underground space 16 and the aboveground space 26, which are controlled by the control process illustrated in FIG. 5 described above. As indicated in FIG. 6, by performing the above control, the temperature of each of the underground space 16 and the aboveground space 26 can be controlled in both the light periods and the dark periods to be close to a temperature at which the plant 1 is cultivated in a natural condition. Specifically, in the light period, by setting the temperature of the underground space 16 to be lower than the temperature of the aboveground space 26, it is possible to create the surrounding environment suitable for each of the underground portion and the aboveground portion. In addition, in the dark period, by decreasing the ambient temperature of the aboveground space 26, it is possible to reduce the amount of respiration of the plant 1. This makes it possible to reduce consumption of nutrient stored by photosynthesis during the light periods. In addition, in the case where both the underground space 16 and the aboveground space 26 are cooled by refrigerated air conditioning for each of the light periods and the dark periods, it is possible to reduce the electric power consumption needed for the refrigerated air conditioning of the aboveground space 26 in the light periods.

In addition, it is preferable that the control unit 50 control the aboveground temperature adjustment unit 90 in the dark periods using the aboveground target temperature for the dark period, which is the same value as the underground target temperature, that is, X° C. According to this approach, the temperature of the aboveground space 26 becomes the same temperature as the underground space 16. By performing this control, it is possible to reduce the amount of respiration of the plant 1 as much as possible without adversely affecting the underground portion 1A of the plant 1.

It is preferable that the control unit 50, in the dark periods, control the aboveground temperature adjustment unit 90 such that the temperature of the aboveground space 26 is decreased to a specified temperature gradually from the temperature of the aboveground space 26 in the light period. This specified temperature (the aboveground target temperature for the dark period, that is, X° C.) may be, for example, the same as the temperature of the underground space 16 or may be a little lower than the temperature of the underground space 16.

Specifically, in the case where the control unit 50 controls the light applying unit 5 such that the light applying unit 5 goes into the state where light is not applied to the plant 1, it is desirable that the aboveground target temperature for the dark period be decreased gradually. Specifically, it is desirable that the control unit 50 decrease the aboveground target temperature for the dark period by a certain value each at intervals of every specified time and control the aboveground temperature adjustment unit 90 based on the aboveground target temperature for the dark period which decreases gradually. For example, it is desirable that the control unit 50 decrease the aboveground target temperature for the dark period by 2° C. each at intervals of every 10 minutes from (X+10)° C. to X° C. and control the aboveground temperature adjustment unit 90 based on the aboveground target temperature for the dark period which decreases gradually. According to this approach, it is possible to reduce adverse effects caused by a sudden temperature change in the aboveground space 26 and exerted to the aboveground portion 1B of the plant 1.

From the same reason, it is preferable that the control unit 50, in the dark periods, control the aboveground humidity adjustment unit 91 such that the humidity of the aboveground space 26 is decreased to a specified humidity gradually from the humidity of the aboveground space 26 in the light period. Specifically, it is desirable that the control unit 50 decrease the aboveground target humidity for the dark period by a certain value each at intervals of every specified time and control the aboveground humidity adjustment unit 91 based on the aboveground target humidity for the dark period which decreases gradually. According to this approach, it is possible to reduce adverse effects caused by a sudden humidity change in the aboveground space 26 and exerted to the aboveground portion of the plant 1.

Although in the embodiment, the ambient temperature around the aboveground portion 1B and the ambient temperature around the underground portion 1A are adjusted by closed-loop control using temperature sensors, those may be adjusted by open-loop control in the case where high control accuracy is not required. For either type of control, the ambient temperature around the aboveground portion 1B and the ambient temperature around the underground portion 1A are independently controlled. For this reason, it is possible to reduce cost necessary for the temperature adjustment and perform the temperature control suitable for the cultivation of the plant 1.

Hereinafter, descriptions will be concretely provided for features of the configuration of the hydroponic apparatus 100 according to the embodiment and effects obtained therefrom.

Generally, the plant 1 shows different physiological activities in light periods and dark periods. Specifically, the plant 1 performs mainly photosynthesis in the light periods and performs mainly respiration in the dark periods. The photosynthesis is an action that the plant 1 performs to store nutrition and the respiration is an action from which the plant 1 consumes the nutrition. Hence, in order to make the plant 1 store more nutrition, it is necessary to increase the amount of the photosynthesis and decrease the amount of the respiration. The amount of the respiration tends to depend on the ambient temperature or humidity around the plant 1. Specifically, the amount of the respiration is small when the temperature is low. In addition, the amount of the respiration is small when the humidity is low. Therefore, in order for the plant 1 to consume as less nutrition stored by the photosynthesis in the light periods as possible, it is desirable to decrease the ambient temperature or humidity of the aboveground space 26 around the plant 1 in the dark periods compared to that in the light periods. The reason of doing this only for the dark periods is that the decrease of the temperature or humidity of the aboveground space 26 around the plant 1 in the light periods may reduce the amount of the photosynthesis. Accordingly, the following hydroponic apparatus 100 of the embodiment is proposed.

(1) The hydroponic apparatus 100 of the embodiment includes the ground surface portion 7, the cultivation tank 6, the light applying unit 5, the aboveground temperature detection unit 8, the aboveground temperature adjustment unit 90, and the control unit 50.

The ground surface portion 7 separates the underground space 16 where the underground portion of the plant 1 grows and the aboveground space 26 where the aboveground portion of the plant 1 grows. The cultivation tank 6 encloses the underground space 16 together with the ground surface portion 7 and stores the water or nutrient solution 60 supplied to the plant 1. The light applying unit 5 is controlled to go into the light periods in which light is applied to the plant 1 and the dark periods in which light is not applied to the plant 1.

The aboveground temperature detection unit 8 detects the temperature of the aboveground space 26. The aboveground temperature adjustment unit 90 adjusts the temperature of the aboveground space 26. The control unit 50 controls the light applying unit 5. The control unit 50 controls the aboveground temperature adjustment unit 90 based on the information on the temperature of the aboveground space 26 detected by the aboveground temperature detection unit 8. The control unit 50 controls the aboveground temperature adjustment unit 90 such that the temperature of the aboveground space 26 in the dark periods is lower than in the light periods.

The above configuration makes it possible to create the surrounding environment suitable for each of the underground portion 1A and the aboveground portion 1B in each of the light periods and the dark periods. In other words, this makes it possible to grow the plant 1 in hydroponic cultivation in a condition similar to natural cultivation.

In addition, by decreasing the temperature of the aboveground space 26 in the dark periods, it is possible to decrease the amount of respiration of the plant 1 in the dark periods. By doing so, it is possible to reduce consumption of the nutrient stored by the photosynthesis in the light periods.

The light applying unit 5 may be an artificial light source that emits light by itself, or alternatively may be a light guide member that applies to the plant 1 light guided from the sunlight or an artificial light source that emits light by itself.

(2) It is preferable that the control unit 50, in the dark periods, control the aboveground temperature adjustment unit 90 such that the temperature of the aboveground space 26 is decreased to a specified temperature gradually from the temperature of the aboveground space 26 in the light period.

The above configuration makes it possible to reduce adverse effects caused by a sudden temperature change in the aboveground space 26 and exerted to the aboveground portion of the plant 1.

(3) It is preferable that the hydroponic apparatus 100 include the underground temperature detection unit 9 and the underground temperature adjustment units 20, 40, and 78. The underground temperature detection unit 9 detects the temperature of the underground space 16. The underground temperature adjustment units 20, 40, and 78 adjust the temperature of the underground space 16. The control unit 50 controls the underground temperature adjustment units 20, 40, and 78 based on the information on the temperature of the underground space 16 detected by the underground temperature detection unit 9. In this case, it is preferable that the control unit 50 controls the underground temperature adjustment units 20, 40, and 78 and the aboveground temperature adjustment unit 90 in the light periods such that the temperature of the underground space 16 is lower than the temperature of the aboveground space 26.

The above configuration makes it possible to control the temperature of each of the underground space 16 and the aboveground space 26 in both the light periods and the dark periods to be close to a temperature at which the plant 1 is cultivated in a natural condition. Specifically, by setting the temperature of the underground space 16 to be lower than the temperature of the aboveground space 26 in both the light periods and the dark periods, it is possible to create the surrounding environment suitable for each of the underground portion 1A and the aboveground portion 1B.

For example, the aboveground portion 1B of root vegetables such as *Panax ginseng* is tolerant to a high temperature environment, but the underground portion 1A thereof is not tolerant to a high temperature environment. For this reason, the ambient temperature around the underground portion 1A needs to be kept low. The above configuration makes it possible to keep the ambient temperature around the underground portion 1A at a low value. For this reason, it is possible to create the surrounding environment suitable for the aboveground portion 1B of root vegetables.

In addition, there is a case where both the underground space 16 and the aboveground space 26 are cooled by refrigerated air conditioning in each of the light periods and the dark periods. In this case, according to the above configuration, since the temperature of the aboveground space 26 is higher than the temperature of the underground space 16 in the light periods, it is possible to reduce electric power consumption needed for the refrigerated air conditioning of the aboveground space 26 in the light periods.

Each of the underground temperature adjustment units 20, 40, and 78 and the aboveground temperature adjustment unit 90 may be a heat transfer mechanism capable of applying heat to air and removing heat from air. Alternatively, each of the underground temperature adjustment units 20, 40, and 78 and the aboveground temperature adjustment unit 90 may be a damper or the like which adjusts the flow rate of the air with a temperature adjusted in advance.

(4) It is preferable that the control unit 50 control the underground temperature adjustment units 20, 40, and 78 such that the temperatures of the underground space 16 in both the light periods and the dark periods are kept at the same temperature. In this specification, the expression "the temperatures of the underground space 16 in both the light periods and the dark periods are kept at the same temperature" includes the state where the temperatures of the underground space 16 in both the light periods and the dark periods are kept within the same predetermined temperature range. In other words, in this specification, the expression "the same" described above is used including the case where the subject has a certain range.

According to the above configuration, it is possible to change only the temperature of the aboveground space 26, which affects the reduction of respiration, in both the light periods and the dark periods. This prevents adverse effects caused by the reduction of the respiration from being exerted to the underground portion 1A of the plant 1. This is suitable especially for cultivation of root vegetables in which the ambient temperature around the underground portion 1A of the plant 1 is preferably kept constant. However, depending of the characteristic of the plant 1, there is a case where the temperature of the underground space 16 may be different in the light periods and the dark periods.

(5) It is preferable that the control unit 50 control the underground temperature adjustment units 20, 40, and 78 and the aboveground temperature adjustment unit 90 in the dark periods such that the temperature of the aboveground space 26 comes close to the temperature of the underground space 16.

The above configuration makes it possible to reduce the amount of respiration of the plant 1 as much as possible, while reducing the adverse effects caused by the temperature of the aboveground space 26 falling below the temperature of the underground space 16 and exerted to the underground portion 1A of the plant 1.

However, depending of the characteristic of the plant 1, there is a case where the temperature of the aboveground space 26 may fall below the temperature of the underground space 16 in the dark periods.

(6) It is preferable that the control unit 50 control the underground temperature adjustment units 20, 40, and 78 and the aboveground temperature adjustment unit 90 in the dark periods such that the temperature of the aboveground space 26 and the temperature of the underground space 16 become the same. In this case, the expression "the temperature of the aboveground space 26 and the temperature of the underground space 16 become the same" includes the state where the temperature of the aboveground space 26 and the temperature of the underground space 16 become within the same predetermined temperature range. In other words, in this specification, the expression "the same" described above is used including the case where the subject has a certain range. According to this approach, it is possible to reduce the amount of respiration of the plant 1 as much as possible without exerting adverse effects to the underground portion 1A of the plant 1.

(7) The hydroponic apparatus 100 of the embodiment includes the ground surface portion 7, the cultivation tank 6, the light applying unit 5, the aboveground humidity detection unit 18, the aboveground humidity adjustment unit 91, and the control unit 50.

The ground surface portion 7 separates the underground space 16 where the underground portion 1A of the plant 1 grows and the aboveground space 26 where the aboveground portion 1B of the plant 1 grows. The cultivation tank 6 encloses the underground space 16 together with the ground surface portion 7 and stores the water or nutrient solution 60 supplied to the plant 1. The light applying unit 5 is controlled to go into either of the state for the light periods in which light is applied to the plant 1 and the state for the dark periods in which light is not applied to the plant 1.

The aboveground humidity detection unit 18 detects the humidity of the aboveground space 26. The aboveground humidity adjustment unit 91 adjusts the humidity of the aboveground space 26. The control unit 50 controls the light applying unit 5. The control unit 50 controls the aboveground humidity adjustment unit 91 based on the information on the humidity of the aboveground space 26 detected by the aboveground humidity detection unit 18. The control unit 50 controls the aboveground humidity adjustment unit 91 such that the humidity of the aboveground space 26 in the dark periods is lower than in the light periods.

The above configuration makes it possible to create the surrounding environment suitable for each of the underground portion 1A and the aboveground portion 1B in each of the light periods and the dark periods. In addition, by decreasing the humidity of the aboveground space 26 in the dark periods, it is possible to decrease the amount of respiration of the plant 1 in the dark periods. By doing so, it is possible to reduce consumption of the nutrient stored by the photosynthesis in the light periods.

(8) It is preferable that the control unit 50, in the dark period, control the aboveground humidity adjustment unit 91 such that the humidity of the aboveground space 26 is decreased to a specified humidity gradually from the humidity of the aboveground space 26 in the light period.

The above configuration reduces adverse effects caused by a sudden humidity change in the aboveground space 26 and exerted to the aboveground portion of the plant 1.

Note that the embodiments described above are examples of the present invention. Hence, the present invention is not limited to the above embodiments, and besides the embodiments, various modifications can be made depending on the design and the like without departing from the technical spirit of the present invention as a matter of course.

This application claims the benefit of priority of Japanese Patent Application No. 2014-178925, filed on Sep. 3, 2014, and the entire content of the Japanese application is incorporated herein by reference.

REFERENCE SIGNS LIST

1 Plant
1A Underground portion
1B Aboveground portion
5 Light applying unit
6 Cultivation tank
7 Ground surface portion
8 Aboveground temperature detection unit
9 Underground temperature detection unit
16 Underground space
18 Aboveground humidity detection unit
19 Underground humidity detection unit
26 Aboveground space
20, 40, 78 Underground temperature adjustment unit
41 Underground humidity adjustment unit
50 Control unit
60 Water or nutrient solution
90 Aboveground temperature adjustment unit
91 Aboveground humidity adjustment unit
100 Hydroponic apparatus

The invention claimed is:

1. A hydroponic apparatus comprising:
a ground surface portion that separates an underground space where an underground portion of a plant grows and an aboveground space where an aboveground portion of the plant grows;
a cultivation tank that encloses the underground space together with the ground surface portion and stores water or nutrient solution to be supplied to the plant;
a light applying unit that is controlled to enter either of a light period state in which light is applied to the plant and a dark period state in which light is not applied to the plant;
an aboveground temperature detector that detects a temperature of the aboveground space;
an aboveground temperature adjuster that adjusts the temperature of the aboveground space; and
an underground temperature detector that detects an ambient temperature of the underground space;
an underground temperature adjuster that adjusts the ambient temperature of the underground space, and
a controller that controls the aboveground temperature adjuster based on information on the temperature of the aboveground space detected by the aboveground temperature detector while controlling the light applying unit, wherein
the controller controls the aboveground temperature adjuster such that the temperature of the aboveground space in the dark period state is lower than the temperature of the aboveground space in the light period state,
the controller controls the underground temperature adjuster and the aboveground temperature adjuster in the light period state such that the temperature of the underground space is lower than the temperature of the aboveground space based on the information on the temperature of the underground space detected by the underground temperature detector, and
the controller controls the underground temperature adjuster such that the temperatures of the underground space in both the light period state and the dark period state are kept at the same temperature.

2. The hydroponic apparatus according to claim 1, wherein
the controller controls the aboveground temperature adjuster in the dark period state such that the temperature of the aboveground space decreases gradually from the temperature of the aboveground space in the light period state to a specified temperature.

3. A hydroponic apparatus comprising:
a ground surface portion that separates an underground space where an underground portion of a plant grows and an aboveground space where an aboveground portion of the plant grows;
a cultivation tank that encloses the underground space together with the ground surface portion and stores water or nutrient solution to be supplied to the plant;
a light applying unit that is controlled to enter either of a light period state in which light is applied to the plant and a dark period state in which light is not applied to the plant;
an aboveground temperature detector that detects a temperature of the aboveground space;
an aboveground temperature adjuster that adjusts the temperature of the aboveground space;
an underground temperature detector that detects a temperature of the underground space;

an underground temperature adjuster that adjusts the temperature of the underground space, and a controller that controls the aboveground temperature adjuster based on information on the temperature of the aboveground space detected by the aboveground temperature detector while controlling the light applying unit, wherein the controller controls the aboveground temperature adjuster such that the temperature of the aboveground space in the dark period state is lower than the temperature of the aboveground space in the light period state, the controller controls the underground temperature adjuster and the aboveground temperature adjuster in the light period state such that the temperature of the underground space is lower than the temperature of the aboveground space based on the information on the temperature of the underground space detected by the underground temperature detector, and the controller controls the underground temperature adjuster and the aboveground temperature adjuster in the dark period state such that the temperature of the aboveground space approaches to the temperature of the underground space.

4. The hydroponic apparatus according to claim 3, wherein the controller controls the aboveground temperature adjuster in the dark period state such that the temperature of the aboveground space decreases gradually from the temperature of the aboveground space in the light period state to a specified temperature.

5. A hydroponic apparatus comprising:

a ground surface portion that separates an underground space where an underground portion of a plant grows and an aboveground space where an aboveground portion of the plant grows;

a cultivation tank that encloses the underground space together with the ground surface portion and stores water or nutrient solution to be supplied to the plant;

a light applying unit that is controlled to enter either of a light period state in which light is applied to the plant and a dark period state in which light is not applied to the plant;

an aboveground temperature detector that detects a temperature of the aboveground space;

an aboveground temperature adjuster that adjusts the temperature of the aboveground space;

an underground temperature detector that detects a temperature of the underground space;

an underground temperature adjuster that adjusts the temperature of the underground space, and a controller that controls the aboveground temperature adjuster based on information on the temperature of the aboveground space detected by the aboveground temperature detector while controlling the light applying unit, wherein the controller controls the aboveground temperature adjuster such that the temperature of the aboveground space in the dark period state is lower than the temperature of the aboveground space in the light period state, the controller controls the underground temperature adjuster and the aboveground temperature adjuster in the light period state such that the temperature of the underground space is lower than the temperature of the aboveground space based on the information on the temperature of the underground space detected by the underground temperature detector, the controller controls the underground temperature adjuster and the aboveground temperature adjuster in the dark period state such that the temperature of the aboveground space becomes the same temperature as the underground space.

6. The hydroponic apparatus according to claim 5, wherein the controller controls the aboveground temperature adjuster in the dark period state such that the temperature of the aboveground space decreases gradually from the temperature of the aboveground space in the light period state to a specified temperature.

* * * * *